United States Patent
Yamashita

(10) Patent No.: US 9,027,600 B2
(45) Date of Patent: May 12, 2015

(54) ACCUMULATOR

(75) Inventor: Matsuyoshi Yamashita, Kikugawa (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 14/348,159

(22) PCT Filed: Aug. 2, 2012

(86) PCT No.: PCT/JP2012/069649
§ 371 (c)(1),
(2), (4) Date: Mar. 28, 2014

(87) PCT Pub. No.: WO2013/140637
PCT Pub. Date: Sep. 26, 2013

(65) Prior Publication Data
US 2014/0224368 A1 Aug. 14, 2014

(30) Foreign Application Priority Data
Mar. 22, 2012 (JP) .................. 2012-064664

(51) Int. Cl.
*F16L 55/04* (2006.01)
*F16L 55/053* (2006.01)
*F15B 1/10* (2006.01)
*F15B 20/00* (2006.01)

(52) U.S. Cl.
CPC ............ *F16L 55/053* (2013.01); *F15B 1/103* (2013.01); *F15B 20/007* (2013.01); *F15B 2201/3158* (2013.01)

(58) Field of Classification Search
CPC ............ F15B 1/103; F15B 2201/205; F15B 2201/411; F15B 2201/3153; F15B 2201/3158; F16L 55/053; F16L 55/043
USPC .................. 138/30, 31, 26; 220/721; 303/87
See application file for complete search history.

(56) References Cited

U.S. PATENT DOCUMENTS

| | | | | |
|---|---|---|---|---|
| 2,365,994 | A * | 12/1944 | Ashton | 138/31 |
| 4,997,009 | A * | 3/1991 | Niikura et al. | 138/30 |
| 5,771,936 | A * | 6/1998 | Sasaki et al. | 138/31 |
| 6,789,576 | B2 * | 9/2004 | Umetsu et al. | 138/30 |
| 6,810,915 | B2 * | 11/2004 | Umetsu et al. | 138/31 |
| 6,871,670 | B2 * | 3/2005 | Suzuki et al. | 138/30 |
| 6,871,672 | B2 * | 3/2005 | Kurokawa et al. | 138/31 |
| 7,325,571 | B2 * | 2/2008 | Shimbori et al. | 138/30 |

(Continued)

FOREIGN PATENT DOCUMENTS

| | | |
|---|---|---|
| EP | 1323928 A1 | 7/2003 |
| JP | 59-197680 A | 11/1984 |

(Continued)

*Primary Examiner* — Patrick F Brinson
(74) *Attorney, Agent, or Firm* — Harness, Dickey & Pierce, P.L.C.

(57) ABSTRACT

An accumulator of the invention is provided with a safety mechanism for an emergency which releases an internal pressure of the housing to the oil port side so as to prevent the housing from being exploded by the internal pressure of the housing which comes to a higher pressure in an emergency, for example, occurrence of fire disaster. The safety mechanism for the emergency has a taper portion in a corner portion between the tubular portion and the end surface portion of the stay. The taper portion is buckled at its root position in the emergency. In the case that the taper portion is buckled, a pressure releasing flow path is formed between the bellows cap or the retained member and the taper portion as well as the bellows cap or the retained member and the end surface portion come away. The stay can be manufactured only by press molding.

4 Claims, 11 Drawing Sheets

(56) References Cited

U.S. PATENT DOCUMENTS

| | | | |
|---|---|---|---|
| 7,770,599 B2* | 8/2010 | Ota et al. | 138/31 |
| 8,365,772 B2* | 2/2013 | Arikawa et al. | 138/30 |
| 2003/0116209 A1 | 6/2003 | Umetsu et al. | |
| 2005/0061379 A1* | 3/2005 | Mori et al. | 138/31 |
| 2011/0192482 A1* | 8/2011 | Baltes | 138/30 |
| 2014/0224368 A1* | 8/2014 | Yamashita | 138/31 |

FOREIGN PATENT DOCUMENTS

| | | |
|---|---|---|
| JP | 08-247102 A | 9/1996 |
| JP | 2003-172301 A | 6/2003 |
| JP | 2009-236137 A | 10/2009 |
| JP | 2010-127332 A | 6/2010 |
| JP | 2010-127378 A | 6/2010 |
| WO | WO-2010-061770 A1 | 6/2010 |

* cited by examiner

ACCUMULATOR

CROSS-REFERENCE TO RELATED APPLICATIONS

This application is a U.S. National Stage Application of International Application No. PCT/JP2012/069649, filed on Aug. 2, 2012, and published in Japanese as WO 2013/140637 A1 on Sep. 26, 2013. This application claims priority to Japanese Application No. 2012-064664, filed on Mar. 22, 2012. The disclosures of the above applications are incorporated herein by reference.

BACKGROUND OF THE INVENTION

1. Field of the Invention

The present invention relates to an accumulator which is used as a pressure accumulator or a pulse pressure damping device. The accumulator according to the present invention is used, for example, in an automotive hydraulic system or a hydraulic system for an industrial device.

2. Description of the Conventional Art

Conventionally, as shown in FIG. 11, there has been known an accumulator 51 structured such that an accumulator housing 52 is provided with an oil port 53 which is connected to a pressure piping (not shown), and is provided with a gas charging port 54, an internal space of the accumulator housing 52 is comparted into a gas chamber 57 which is filled with gas by a bellows 55 with a bellows cap 56 and a liquid chamber 58 which is communicated with the oil port 53, and the accumulator 51 is activated in a pressure accumulation manner or is activated in a pulse pressure damping manner on the basis of a movement of the bellows cap 56 and an expanding and contracting motion of the bellows 55 so that the gas pressure and the liquid pressure are balanced (refer to Japanese Unexamined Patent Publication No. 2003-172301).

Further, the accumulator 51 is provided with a safety mechanism (a safety mechanism for a pressure reducing time) 59 which prevents the bellows 55 from being broken due to an unbalance between the gas pressure and the liquid pressure, in the case that the pressure of the pressure piping is reduced and the pressure of the liquid chamber 58 is reduced. In other words, in the case that the pressure of the pressure piping is reduced extremely due to stop of an operation of the device, the liquid (the oil) is discharged little by little from the oil port 53. As a result, the bellows 55 is accordingly deflated little by little by the charged gas pressure, and a seal 60 provided in a lower surface of the bellows cap 56 comes into contact with a stay 61 so as to come to a so-called zero-down state. The stay 61 is a single metal molded product in which a liquid port opening 61c is provided in an end surface portion 61b in a leading end of a tubular portion 61a. Further, in the zero-down state, a part of the liquid is confined in the liquid chamber 58 by the seal 60, and since the pressure of the confined liquid and the gas pressure of the gas chamber 57 are balanced, it is possible to inhibit the excessive stress from being applied to the bellows 55 and inhibit the bellows 55 from being broken.

Further, the accumulator 51 is provided with a safety mechanism (a safety mechanism for an emergency) 62 which prevents the liquid within the liquid chamber 58 and the gas within the gas chamber 57 from being rapidly inflated and prevents the accumulator 51 from being exploded, in an emergency such as a fire disaster occurrence. In other words, in the case that the liquid within the liquid chamber 58 and the gas within the gas chamber 57 are rapidly inflated due to the occurrence of the fire disaster, a rupture plate (a vulnerable part) 61d provided locally and circumferentially on a peripheral surface (the tubular portion 61a) of the stay 61 is ruptured due to the high pressure, and the high pressure is released. Therefore, an inner portion of the accumulator 51 is inhibited from becoming extremely high pressure so as to cause an explosion.

However, in the prior art mentioned above, since the safety mechanism 62 for the emergency is constructed by the rupture plate 61d which is locally and circumferentially provided on the peripheral surface (the tubular portion 61a) of the stay 61 as mentioned above, the rupturing pressure is high (such a high pressure as to rupture the metal plate is necessary). As a result, there is a disadvantage that the safety mechanism 62 for the emergency is not activated until the pressure becomes very high. Further, in order to provide the circumferential and local rupture plate 61d on the peripheral surface (the tubular portion 61a) of the stay 61, it is necessary to additionally execute a cutting process after press molding the stay 61. As a result, there is a disadvantage that a lot of labor hour and time are required for manufacturing the stay 61.

SUMMARY OF THE INVENTION

Problem to be Solved by the Invention

The present invention is made by taking the above points into consideration, and an object of the present invention is to provide an accumulator provided with a safety mechanism for an emergency which can be activated by a lower pressure than that of the case that a rupture plate is circumferentially and locally provided on a peripheral surface of a stay. Further, an addition object of the present invention is to provide an accumulator in which a stay can be manufactured only by a press molding.

Means for Solving the Problem

In order to achieve the objects mentioned above, an accumulator according to a first aspect of the present invention is an accumulator comprising:

an accumulator housing which is provided with an oil port connected to a pressure piping and is provided with a gas charging port;

a stay which is arranged in an inner side of the oil port within the housing and is provided with a liquid port opening in an end surface portion in a leading end of a tubular portion; and a bellows which is arranged within the housing, is provided with a bellows cap in a floating end and comparts a space within the housing into a gas chamber in which gas is charged and a liquid chamber which is communicated with the oil port, wherein the accumulator further comprises:

a safety mechanism for a pressure reducing time which confines a part of the liquid in the liquid chamber on the basis of a hermetically seal between the bellows cap or a retained member retained to the bellows cap and an end surface portion of the stay in the case that the pressure of the liquid chamber is reduced in connection with the pressure reduction of the pressure piping; and a safety mechanism for an emergency which releases an internal pressure of the housing to the oil port side so as to prevent the housing from being exploded by the internal pressure of the housing which comes to a higher pressure in an emergency, for example, occurrence of fire disaster, and wherein the safety mechanism for the emergency has a taper portion in a corner portion between the tubular portion and the end surface portion of the stay, the taper portion is buckled at its root position in the emergency, and in the case that the taper portion is buckled, a pressure releasing flow path is formed between the bellows cap or the retained member and the taper portion as well as the bellows cap or the retained member and the end surface portion come away.

Further, an accumulator according to a second aspect of the present invention is the accumulator described in the first aspect mentioned above, wherein the pressure releasing flow path is formed by a concave portion or a circumferentially partial concave portion or convex portion which is going to come into contact with the bellow cap or the retained member in the case that the taper portion is buckled, and is provided in a corner portion between the taper portion and the end surface portion, or a circumferentially partial concave portion of convex portion which is provided in the taper portion.

Further, an accumulator according to a third aspect of the present invention is the accumulator described in the first aspect mentioned above, wherein the pressure releasing flow path is formed by a second retained member which is retained to the bellows cap, the second retained member being pinched between the bellows cap or the retained member and the taper portion in the case that the taper portion is buckled.

Further, an accumulator according to a fourth aspect of the present invention is the accumulator described in the third aspect mentioned above, wherein the retained member is constructed by a gasket which is retained to the bellows cap via a gasket holder, and the second retained member is constructed by the gasket holder.

In the accumulator according to the present invention having the structure mentioned above, the stay is structured such that the taper portion is provided in the corner portion between the tubular portion and the end surface portion, the bellows cap or the retained member presses the stay on the basis of the housing internal pressure which comes to the high pressure in the emergency, for example, the occurrence of the fire disaster and the stay is buckled at the root position of the taper portion, so that the bellows cap or the retained member comes away from the end surface portion at this time, and the pressure releasing flow path is formed between the bellows cap or the retained member and the taper portion. Therefore, the pressure is not necessarily so great that the stay is ruptured, but the safety mechanism for the emergency is activated by such a pressure that the stay is buckled at the root position of the taper portion. Therefore, there can be provided the safety mechanism for the emergency which can be activated by the lower pressure in comparison with that of the rupture plate case.

The pressure releasing flow path is set as follows.

(1) In the case that the taper portion provided in the corner portion between the tubular portion and the end surface portion in the stay is buckled at the root position thereof, the corner portion between the taper portion and the end surface portion or the taper portion comes into contact with the bellows cap or the retained member, in place of the end surface portion. Therefore, it is possible to communicate the liquid chamber and the oil port side by the concave portion, by previously setting the circumferentially partial concave portion in the corner portion between the taper portion and the end surface portion or the taper portion. The circumferentially partial convex portion may be substituted for the circumferentially partial concave portion. In this case, since the relative concave portion is formed just next to the convex portion while assuming the convex portion as a spacer, it is possible to communicate the liquid chamber and the oil port side by the relative concave portion.

(2) In the case that the taper portion provided in the corner portion between the tubular portion and the end surface portion in the stay is buckled at the root position thereof, the second retained member retained to the bellows cap is pinched between the bellows cap or the retained member and the taper portion. Therefore, it is possible to communicate the liquid chamber and the oil port side on the basis of the pinching structure. The second retained member can communicate the liquid chamber and the oil port side by setting a notch or a through hole in the circumferentially partial portion in the case that the pinched position is formed annular, and can communicate the liquid chamber and the oil port side by a space the between the pinched positions without particularly setting anything in the case that the pinched position is the circumferentially partial portion. In the case that the safety mechanism for the pressure reducing time is provided with the gasket as the retained member which is retained to the bellows cap and is provided with the gasket holder which retained the gasket, the gasket holder can be employed as the second retained member.

Effect of the Invention

The present invention achieves the following effects.

In the present invention, since the safety mechanism for the emergency is not structured such that the stay is ruptured, but is structured such that the taper portion provided between the tubular portion and the end surface portion is buckled at the root position thereof, the safety mechanism for the emergency can be activated by the comparatively low pressure, and it is possible to enhance a safety in relation to the prevention of the accumulator from being ruptured at this degree. Further, in the case that the pressure releasing flow path is formed by the circumferentially partial concave portion or convex portion which is provided in the corner portion between the taper portion and the end surface portion, or he circumferentially partial concave portion or convex portion which is provided in the taper portion, the concave portion or the convex portion can be formed by a press molding. Therefore, it is not necessary to execute a cutting process at the time of manufacturing the stay. Further, in the case that the pressure releasing flow path is formed by pinching the second retained member, the taper portion is only provided in the stay. Therefore, it is not necessary to execute the cutting process at the time of manufacturing the stay. Accordingly, a lot of labor hour and time are not required for manufacturing the stay, and it is possible to provide an accumulator product which is advantageous in cost.

DETAILED DESCRIPTION OF PREFERRED EMBODIMENTS

Figure 1:
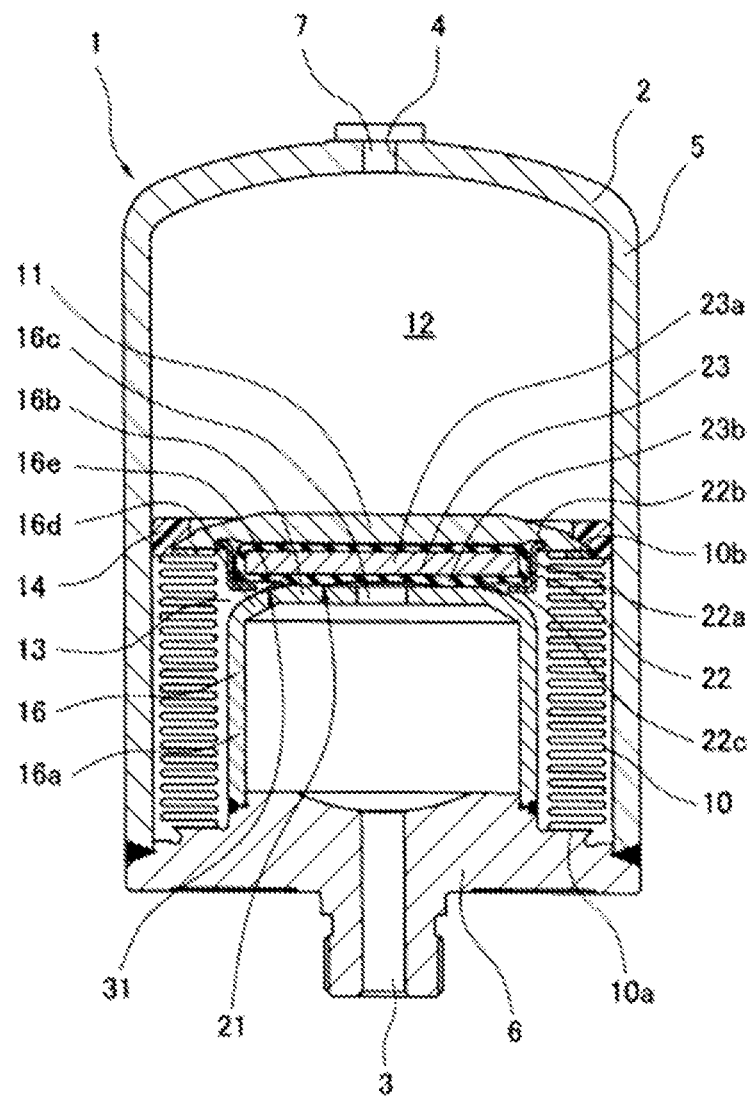
FIG. 1 is a cross sectional view of an accumulator according to a first embodiment of the present invention.

The following embodiments are included in the present invention.

(1-1) A shape of a stay is structured such that a taper portion is set in a corner portion from a seal surface in an upper surface to a side surface. Concave grooves are formed at several positions of a ridge line (including a round part in the corner portion) of the corner portion of the taper surface of the stay and the upper surface of the seal. The concave groove may be constructed by a concave groove which extends over the taper surface of the stay and passes through the seal upper surface. Further, convex portions may be formed in place of the concave grooves on the taper portion. An angle of taper of the stay is set on the basis of a relationship of a gas pressure since the angle of taper is associated with a deforming pressure. Since the seal surface is not buckled to an inner side in the case that the angle is too large, the effect can not be obtained. The accumulator may have an inside gas structure or an outside gas structure.

(1-2) In a depressurizing method, a force is applied so that a gasket bracket crushes the stay in the case that the charged gas comes to a high pressure state. The seal surface in the upper surface of the stay is buckled to an inner peripheral side from a root of the taper on the basis of a load from above. After the buckling, the concave grooves of the stay serve as through holes and depressurize. Since the stay is manufactured only by a press molding, and does not need any additional process, the stay can be inexpensively provided.

(2-1) The shape of the stay is structured such that the taper portion is set in the corner portion from the seal surface in the upper surface to the side surface. A member (a seal holder) retaining a gasket (a seal) is set in a gap between the taper portion of the stay and the gasket portion so as to overlap. The seal holder is set so as to have a smaller inner diameter than an outer diameter of a bracket of the gasket. Further, notches are set at several positions in the seal holder from a bottom surface to a side surface. Convex portions forming through holes may be formed in the bottom surface in place of the notches. A member to be pinched is set to the seal holder on a parts structure, however, may be set by the other parts. A taper angle of the stay is set on the basis of the relationship of the gas pressure since the taper angle is associated with the deforming pressure. Since the seal surface is not buckled to an inner side in the case that the angle is too large, the effect can not be obtained. The accumulator may have an inside gas structure or an outside gas structure.

(2-2) In a depressurizing method, a force is applied so that a gasket bracket crushes the stay in the case that the charged gas comes to a high pressure state. The seal surface in the upper surface of the stay is buckled to an inner peripheral side from a root of the taper on the basis of a load from above. In the process of the buckling, the seal holder is pinched between the gasket bracket and the stay. The notches set at several positioned in the seal holder serve as the through holes and depressurize. Since the stay and the seal holder are both manufactured only by the press molding, and do not need any additional process, the stay and the seal holder can be inexpensively provided.

Embodiment

Next, a description will be given of embodiments according to the present invention with reference to the accompanying drawings.

First Embodiment

FIG. 1 shows a cross section of an accumulator 1 according to a first embodiment of the present invention. The accumulator 1 according to the embodiment is a metal bellows type accumulator which employs a metal bellows as a bellows 10, and is structured as follows.

In other words, there is provided an accumulator housing 2 which is provided in its one end (a lower end in the drawing) with an oil port 3 connected to a pressure piping (not shown), and is provided in its other end (an upper end in the drawing) with a gas charging port 4, the bellows 10 and a bellows cap 11 are arranged in an inner portion of the housing 2, and the inner portion of the housing 2 is comparted into a gas chamber 12 into which a high-pressure gas (for example, a nitrogen gas) is charged, and a liquid chamber 13 which is communicated with the oil port 3. The housing 2 is drawn as the housing constructed by a combination of a closed-end cylindrical shell 5 and an oil port member 6 which is fixed (welded) to an opening portion in one end of the shell 5, however, a parts layout structure of the housing 2 is not particularly limited. For example, the oil port member 6 and the shell 5 may be integrated, and a bottom portion of the shell 5 may be constructed by an end cover which is independent from the shell 5. In any case, the bottom portion of the shell 5 or a corresponding part is provided with the gas charging port 4 for charging the gas into the gas chamber 12, and the gas charging port 4 is closed by a gas plug 7 after the gas is charged.

The bellows 10 is structured such that its fixed end 10a is fixed (welded) to an inner surface of the oil port member 6 which is an inner surface in the oil port 3 side of the housing 2, and a discoid bellows cap 11 is fixed (welded) to a floating end 10b thereof. Accordingly, the accumulator 1 is structured as an outside gas type accumulator in which the gas chamber 12 is set in an outer peripheral side of the bellows 10 and the liquid chamber 13 is set in an inner peripheral side of the bellows 10. The bellows 10 may be structured such that its fixed end 10a is fixed (welded) to the bottom portion of the shell 5 and the discoid bellows cap 11 is fixed (welded) to its floating end 10b. In this case, the accumulator is structured as an inside gas type accumulator in which the gas chamber 12 is set in the inner peripheral side of the bellows 10 and the liquid chamber 13 is set in the outer peripheral side of the bellows 10. In any case, a damping ring 14 is attached to the outer peripheral portion of the bellows cap 11 so as to prevent the bellows 10 and the bellows cap 11 from coming into contact with the inner surface of the housing 2, however, the damping ring 14 does not achieve a sealing action.

A stay (an inner pedestal) 16 is arranged in the inner surface of the oil port member 6 which is the inner peripheral side of the bellows 10 and the inner surface in the oil port 3 side of the housing 2, and the bellows 10 is arranged in an outer peripheral side of the stay 16.

The stay 16 is constructed by a single metal molded product (a sheet metal press formed product), is obtained by integrally forming an end surface portion 16b toward an inner side in a diametrical direction in one end (an upper end in the drawing) of a tubular portion 16a which is formed as a cylindrical shape, and is fixed (welded) to the inner surface of the oil port member 6 by the other end (a lower end in the drawing) of the tubular portion 16a. A liquid port opening 16c is provided in the center of the end surface portion 16b which is formed as a discoid shape.

Further, the accumulator 1 is provided with a safety mechanism 21 for a pressure reducing time which confines a part of the liquid in the liquid chamber 13 on the basis a hermetically seal between the bellows cap 11 or a retained member retained to the bellows cap 11 and the end surface portion 16b of the stay 16 in the case that the pressure of the liquid chamber 13 is reduced in connection with the pressure reduction of the pressure piping.

The safety mechanism 21 for the pressure reducing time is structured as follows.

Figure 2:
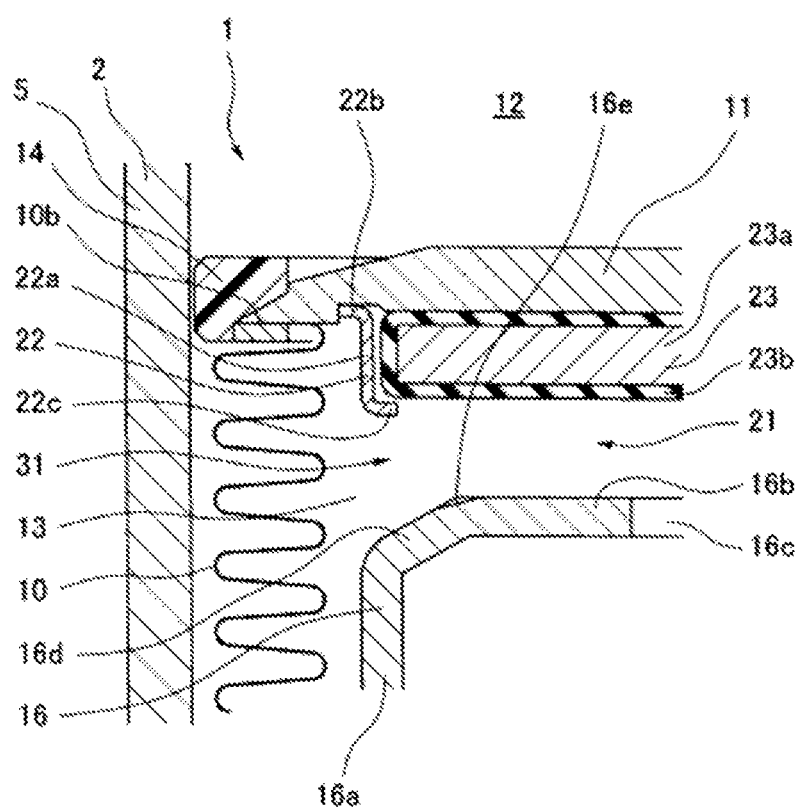
FIG. 2 is an enlarged cross sectional view of a substantial part of the accumulator and shows a state in a steady actuation of the accumulator.
Figure 3:
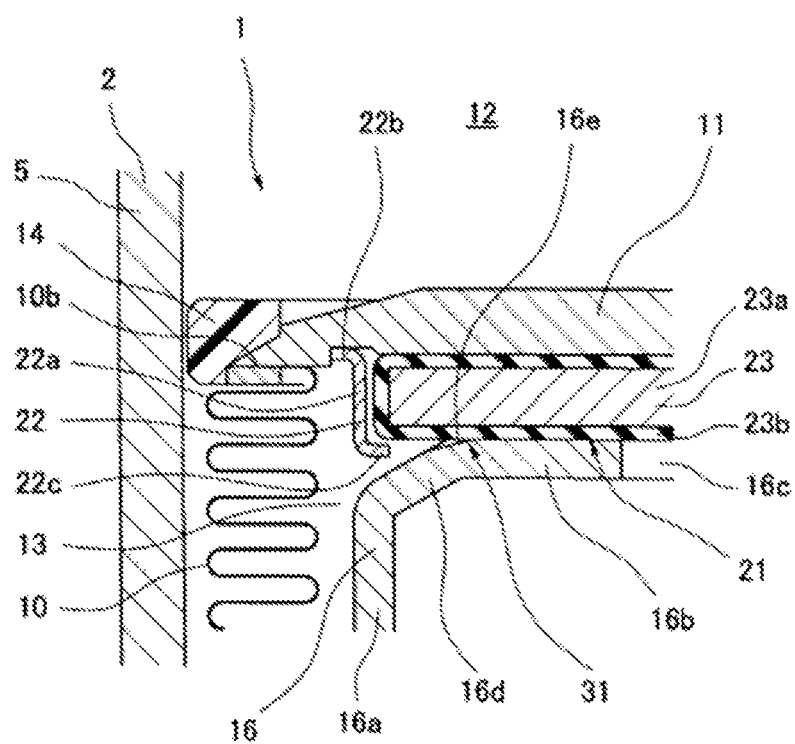
FIG. 3 is an enlarged cross sectional view of a substantial part of the accumulator and shows a state in an actuation of a safety mechanism for a pressure reducing time.

In other words, as shown in FIG. 2 in an enlarged manner, a discoid gasket (seal) 23 is retained as the retained member to a surface (a lower surface in the drawing) of the stay 16 side in the bellows cap 11 via an annular gasket holder (seal holder) 22, and in the case that the bellows cap 11 moves in a direction that the bellows cap 11 comes close to the stay 16 (downward in the drawing), the gasket 23 comes into close contact with the end surface portion 16b of the stay 16 as shown in FIG. 3. As a result, the portion between the bellows cap 11 and the stay 16 is hermetically sealed via the gasket 23, and the liquid port opening 16c is occluded. Accordingly, a part of the liquid is confined in the liquid chamber 13, and the pressure of the confined liquid and the gas pressure of the gas chamber 12 are balanced. Therefore, it is possible to inhibit an excessive stress from being applied to the bellows 10 and inhibit the bellows 10 from being broken.

The gasket holder 22 is structured such that one end (an upper end in the drawing of a tubular portion 22a is provided with a fitting portion 22b to the bellows cap 11 and the other end (a lower end in the drawing) of the tubular portion 22a is provided with an inward flange-shaped retaining portion 22c for retaining the gasket 23. The gasket 23 is structured such that a rubber-like elastic body 23b is attached to a part or a whole of a surface of the discoid metal plate 23a.

The safety mechanism 21 for the pressure reducing time may be structured such that a gasket (not shown) constructed by a rubber-like elastic body is attached to a surface of the stay 16 side in the bellows cap 11 and the gasket is brought into close contact with the end surface portion 16b of the stay 16, in place of the structure mentioned above. Further, the safety mechanism 21 for the pressure reducing time may be structured such that a gasket (not shown) constructed by a rubber-like elastic body is attached to an upper surface of the end surface portion 16b of the stay 16 and the gasket is brought into close contact with the bellows cap 11.

Further, the accumulator 1 is provided with a safety mechanism 31 for an emergency which releases an internal pressure of the housing 2 to the oil port 3 side so as to prevent the housing 2 from being exploded by the internal pressure (the liquid pressure and the gas pressure) of the housing 2 which comes to a higher pressure in an emergency, for example, occurrence of fire disaster.

The safety mechanism 31 for the emergency is structured as follows.

Figure 4:
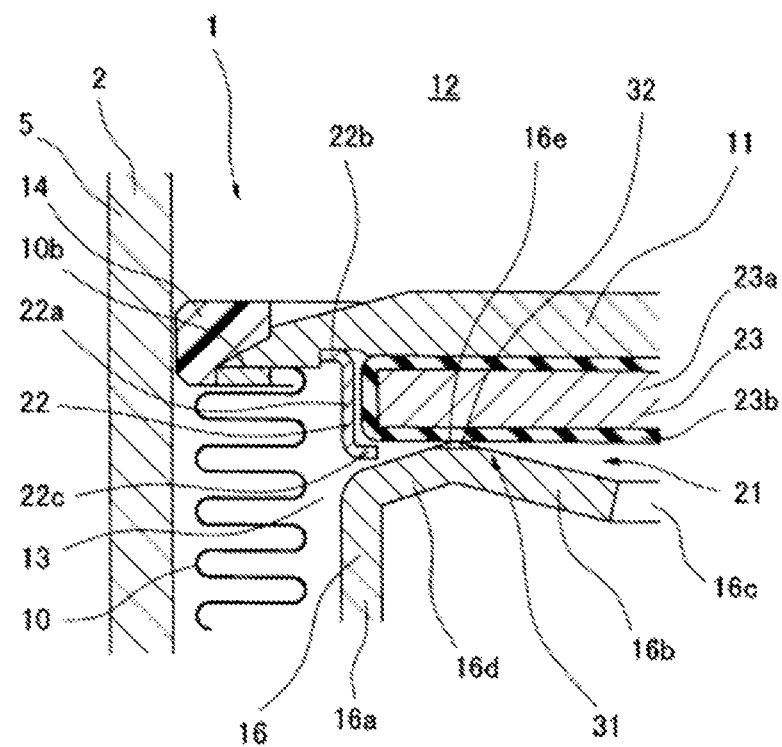
FIG. 4 is an enlarged cross sectional view of a substantial part of the accumulator and shows a state in an actuation of a safety mechanism for an emergency.

In other words, an annular taper portion 16d is provided in a corner portion between the tubular portion 16a and the end surface portion 16b in the stay 16, and the taper portion 16d is structured such that the taper portion 16d is buckled at a root position in the tubular portion 16a side as shown in FIG. 4 in the case that the internal pressure of the housing 2 comes to the high pressure and the taper portion is strongly pressed by the bellows cap 11 or the gasket 23, in the emergency, for example, the occurrence of the fire disaster. In the case that the taper portion 16d is buckled at the root position, the stay 16 is inclined toward an inner side in a diametrical direction, the gasket 23 and the end surface portion 16b of the stay 16 are disconnected, and a pressure releasing flow path 32 is formed between the gasket 23 and the taper portion 16d of the stay 16.

The pressure releasing flow path 32 is formed as follows.

In other words, in the embodiment, in the case that the taper portion 16d of the stay 16 is buckled at the root position as shown in FIG. 4, the gasket 23 and the end surface portion 16b come away and the gasket 23 comes into contact with the corner portion between the taper portion 16d and the end surface portion 16b of the stay 16. Therefore, circumferentially partial concave portions 16e are provided in the corner portion between the taper portion 16d and the end surface portion 16b circumferentially at a plurality of positions, and the concave portions 16e are constructed as the pressure releasing flow path 32 which communicates the liquid chamber 13 and the oil port 3 side. Therefore, since the high pressure is discharged to the oil port 3 side and is further discharged to the pressure piping side by the pressure releasing flow path 32 which is constructed by the concave portions 16e, the housing 2 is inhibited from being exploded. The concave portions 16e mentioned above may be alternatively constructed by convex portions.

In the accumulator 1 having the structure mentioned above, the stay 16 is structured such that the taper portion 16d is provided in the corner portion between the tubular portion 16a and the end surface portion 16b, the bellows cap 11 or the gasket 23 presses the stay 16 by the housing internal pressure coming to the high pressure in the emergency, for example, the occurrence of the fire disaster, the stay 16 is buckled at the root position of the taper portion 16d, and the pressure releasing flow path 32 is formed between the gasket 23 and the taper portion 16d as well as the gasket 23 and the end surface portion 16b come away at this time. Therefore, the pressure is not necessarily so great that the stay 16 is ruptured, but the safety mechanism 31 for the emergency is activated by such a pressure that the stay 16 is buckled at the root position of the taper portion 16d. Therefore, there can be provided the safety mechanism 31 for the emergency which can be activated by the lower pressure in comparison with that of the rupture plate case.

Further, since the pressure releasing flow path 32 is formed by the circumferentially partial concave portions 16e which are provided in the corner portion between the taper portion 16d and the end surface portion 16d, and the concave portions 16e can be formed by a press molding process, it is not necessary to execute the cutting process at the time of manufacturing the stay 16. Therefore, a lot of labor hour and time are not required for manufacturing the stay 16, and it is possible to provide the accumulator product which is advantageous in cost.

It can be thought that the structure of the accumulator 1 according to the first embodiment mentioned above is provided with the following additional structure or is changed as follows.

Second Embodiment

Figure 5:
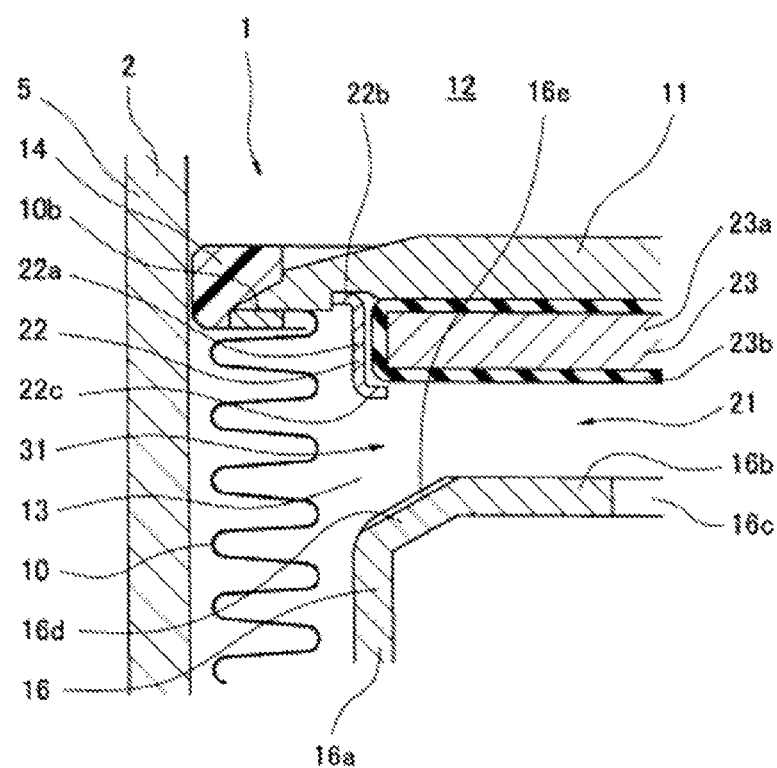
FIG. 5 is a cross sectional view of a substantial part of an accumulator according to a second embodiment of the present invention and shows a state in a steady actuation of the accumulator.
Figure 6:
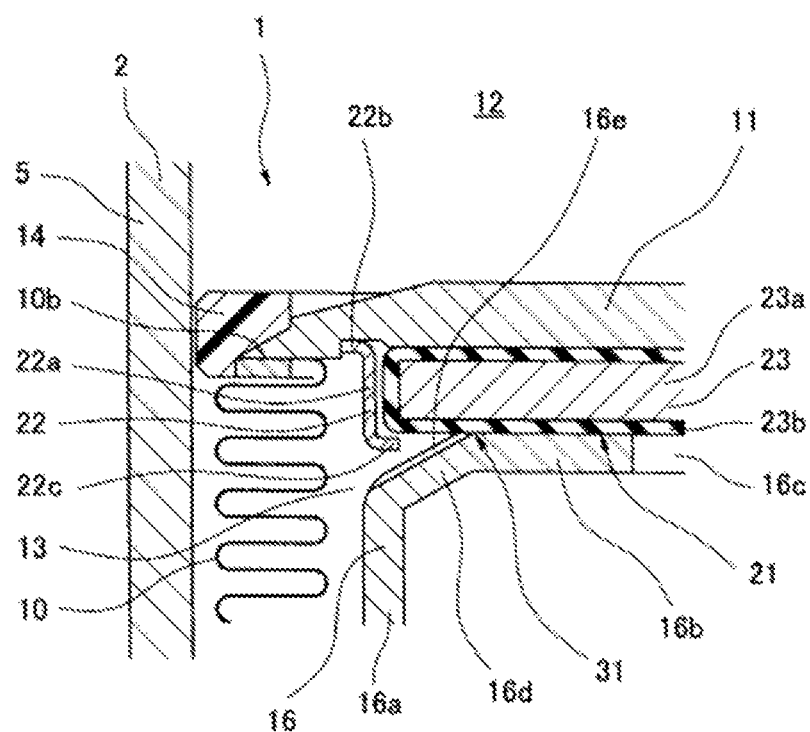
FIG. 6 is a cross sectional view of a substantial part of the accumulator and shows a state in an actuation of a safety mechanism for a pressure reducing time.
Figure 7:
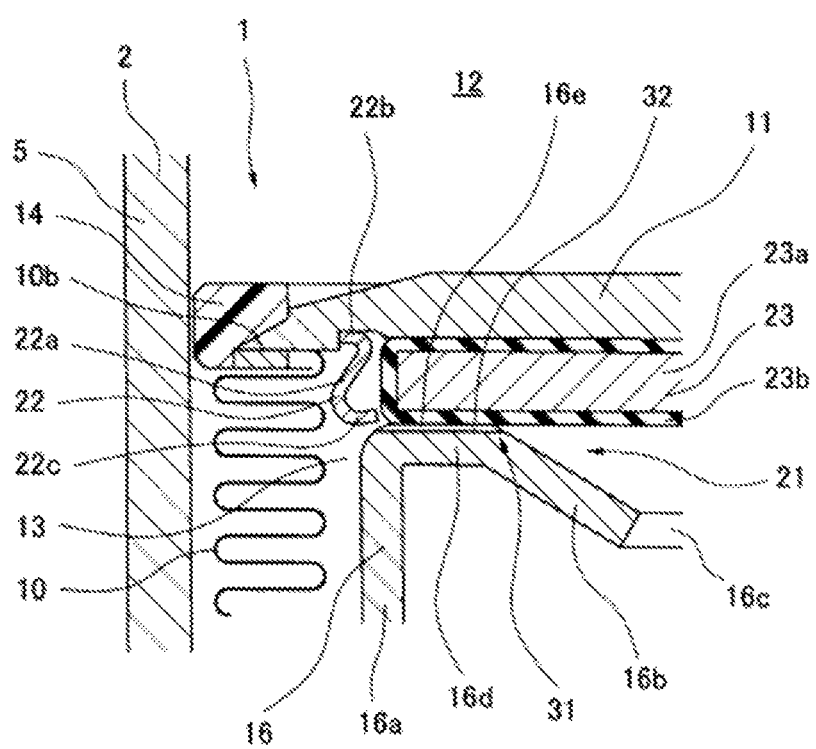
FIG. 7 is a cross sectional view of a substantial part of the accumulator and shows a state in an actuation of a safety mechanism for an emergency.

In the first embodiment mentioned above, in the case that the taper portion 16d of the stay 16 is buckled at the root position, the gasket 23 and the end surface portion 16b of the stay 16 come away and the gasket 23 comes into contact with the corner portion between the taper portion 16d and the end surface portion 16b of the stay 16. In place of this, in the case that the taper portion 16d of the stay 16 is buckled at the root position, the gasket 23 and the end surface portion 16b of the stay 16 may come away and the gasket 23 may come into contact (surface contact) with the taper portion 16d of the stay 16. Therefore, in the case that the contact mentioned above is assumed, the circumferentially partial concave portions 16e are provided circumferentially at a plurality of positions over a whole width in the diametrical direction of the taper portion 16d, as shown in FIGS. 5 to 7, and the liquid chamber 13 is communicated with the oil port 3 side via the concave portion 16e. In this case, the concave portion 16e is preferably formed as a groove shape which extends in the diametrical direction.

Third Embodiment

Figure 8:
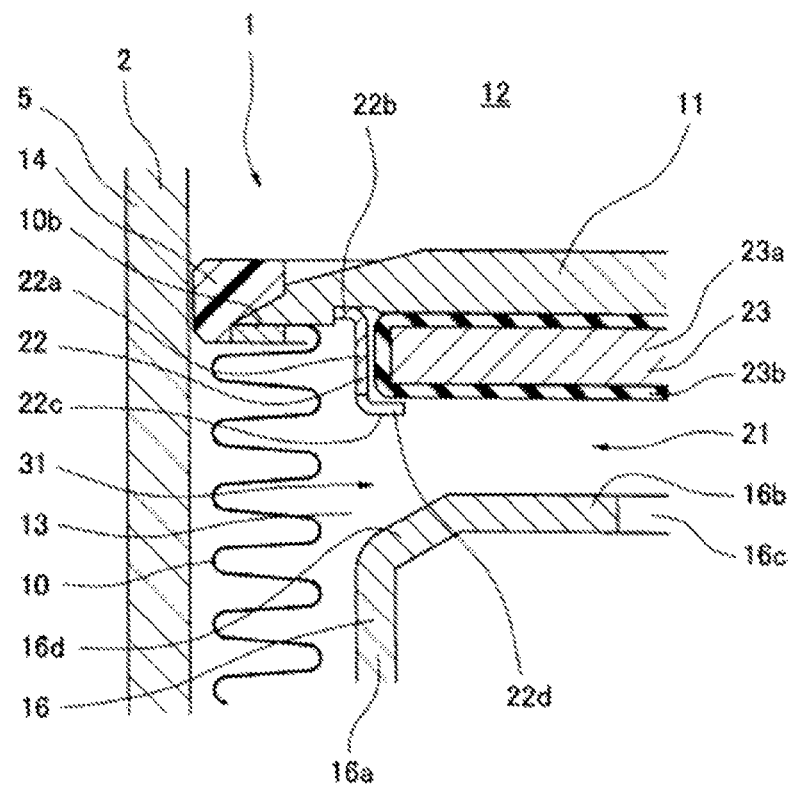
FIG. 8 is a cross sectional view of a substantial part of an accumulator according to a third embodiment of the present invention and shows a state in a steady actuation of the accumulator.
Figure 9:
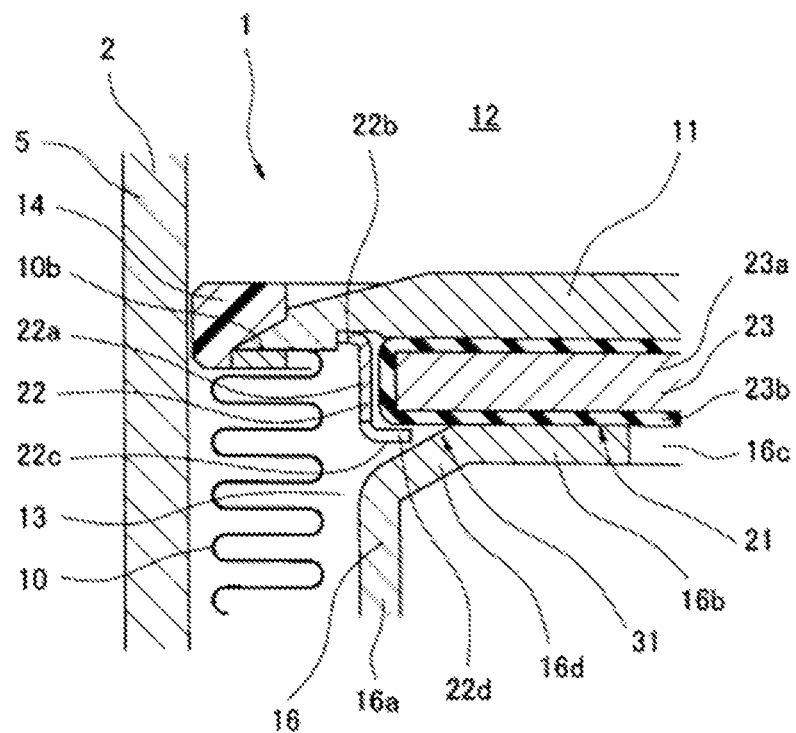
FIG. 9 is a cross sectional view of a substantial part of the accumulator and shows a state in an actuation of a safety mechanism for a pressure reducing time.
Figure 10:
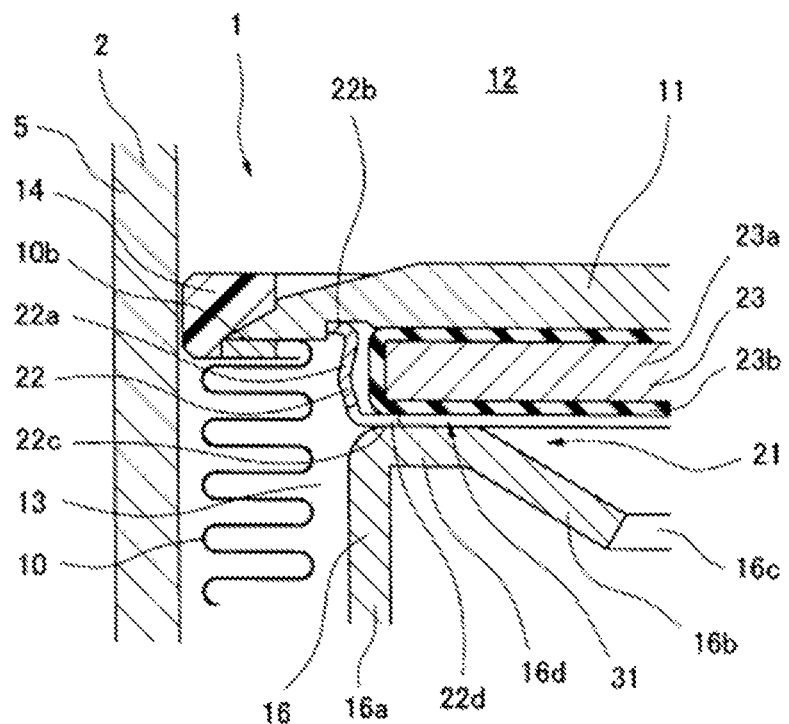
FIG. 10 is a cross sectional view of a substantial part of the accumulator and shows a state in an actuation of a safety mechanism for an emergency.
Figure 11:
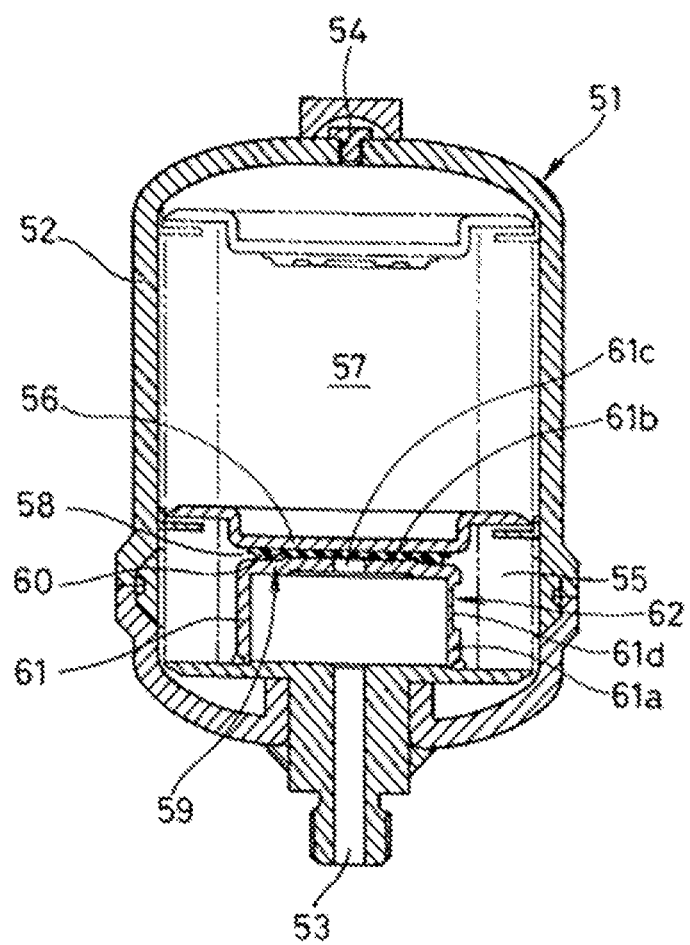
FIG. 11 is a cross sectional view of an accumulator according to a conventional example.

In the first and second embodiments mentioned above, the pressure releasing flow path 32 is formed by the concave portions 16e which are provided in the stay 16. However, in place of this, the pressure releasing flow path 32 is formed by a second retained member retained to the bellows cap 11, the second retained member being pinched between the gasket 23 and the taper portion 16d in the case that the taper portion 16d is buckled at the root position. As a result, in the third embodiment, as shown in FIGS. 8 to 10, the gasket holder 22 serving as the second retained member retained to the bellows cap 11 is pinched between the gasket 23 and the taper portion 16d by the retaining portion 22c, circumferentially partial notches 22d are previously provided in the retaining portion 22c circumferentially at a plurality of positions, and the liquid chamber 13 is communicated with the oil port 3 side via the notches 22d. In this case, in order to securely make the retaining portion 22c of the gasket holder 22 be pinched between the gasket 23 and the taper portion 16d, it is preferable to satisfy a relationship d1<d2 and d1<d3, in which d1 is an inner diameter of the retaining portion 22c, d2 is an outer diameter of the metal plate 23a in the gasket 23, and d3 is an outer diameter of the stay 16.

What is claimed is:

1. An accumulator comprising:
    an accumulator housing which is provided with an oil port connected to a pressure piping and is provided with a gas charging port;
    a stay which is arranged in an inner side of said oil port within said housing and is provided with a liquid port opening in an end surface portion in a leading end of a tubular portion; and
    a bellows which is arranged within said housing, is provided with a bellows cap in a floating end and comparts a space within said housing into a gas chamber in which gas is charged and a liquid chamber which is communicated with said oil port,
    wherein said accumulator further comprises:
    a safety mechanism for a pressure reducing time which confines a part of the liquid in said liquid chamber on the basis of a hermetically seal between said bellows cap or a retained member retained to said bellows cap and an end surface portion of said stay in the case that the pressure of said liquid chamber is reduced in connection with the pressure reduction of said pressure piping; and
    a safety mechanism for an emergency which releases an internal pressure of said housing to said oil port side so as to prevent said housing from being exploded by the internal pressure of the housing which comes to a higher pressure in an emergency, for example, occurrence of fire disaster, and
    wherein said safety mechanism for the emergency has a taper portion in a corner portion between the tubular portion and the end surface portion of said stay, said taper portion is buckled at its root position in the emergency, and in the case that said taper portion is buckled, a pressure releasing flow path is formed between said bellows cap or said retained member and said taper portion as well as said bellows cap or said retained member and said end surface portion come away.

2. The accumulator according to claim 1, wherein said pressure releasing flow path is formed by a concave portion or a circumferentially partial concave portion or convex portion which is going to come into contact with said bellow cap or said retained member in the case that said taper portion is buckled, and is provided in a corner portion between said taper portion and said end surface portion, or a circumferentially partial concave portion of convex portion which is provided in said taper portion.

3. The accumulator according to claim 1, wherein said pressure releasing flow path is formed by a second retained member which is retained to said bellows cap, the second retained member being pinched between said bellows cap or said retained member and said taper portion in the case that said taper portion is buckled.

4. The accumulator according to claim 3, wherein said retained member is constructed by a gasket which is retained to said bellows cap via a gasket holder, and said second retained member is constructed by said gasket holder.

* * * * *